(12) United States Patent
Mirza et al.

(10) Patent No.: US 10,311,362 B1
(45) Date of Patent: Jun. 4, 2019

(54) IDENTIFICATION OF TRENDING CONTENT USING SOCIAL NETWORK ACTIVITY AND USER INTERESTS

(71) Applicant: Amazon Technologies, Inc., Seattle, WA (US)

(72) Inventors: Muneer Mirza, Bellevue, WA (US); Saral Jain, Bellevue, WA (US); Ameet Nirmal Vaswani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 594 days.

(21) Appl. No.: 14/569,367

(22) Filed: Dec. 12, 2014

(51) Int. Cl.
*G06N 5/04* (2006.01)
*G06N 20/00* (2019.01)
*G06F 16/248* (2019.01)

(52) U.S. Cl.
CPC ............ *G06N 5/04* (2013.01); *G06F 16/248* (2019.01); *G06N 20/00* (2019.01)

(58) Field of Classification Search
CPC ... G06N 5/04; G06N 99/005; G06F 17/30554
USPC ....................................................... 706/12
See application file for complete search history.

(56) References Cited

U.S. PATENT DOCUMENTS

| | | | |
|---|---|---|---|
| 7,571,121 B2 | 8/2009 | Bezos et al. | |
| 8,874,558 B1* | 10/2014 | He | G06F 17/30864 707/706 |
| 9,104,970 B2* | 8/2015 | Lahav | G06Q 30/02 |
| 9,208,444 B1* | 12/2015 | Zheng | G06Q 30/0201 |
| 2010/0287152 A1* | 11/2010 | Hauser | G06F 16/951 707/707 |
| 2010/0325615 A1* | 12/2010 | Ramot | G06F 11/3672 717/124 |
| 2011/0320715 A1* | 12/2011 | Ickman | G06Q 30/02 711/118 |
| 2015/0193540 A1* | 7/2015 | Wexler | G06F 17/30867 707/734 |
| 2015/0347411 A1* | 12/2015 | Friggeri | G06F 17/3053 707/728 |
| 2015/0379577 A1* | 12/2015 | Han | G06Q 30/0264 705/14.61 |
| 2016/0048856 A1* | 2/2016 | Wouhaybi | G06Q 30/02 705/7.33 |

* cited by examiner

*Primary Examiner* — Li Wu Chang
(74) *Attorney, Agent, or Firm* — Knobbe, Martens, Olson & Bear, LLP

(57) ABSTRACT

Network accessible content, including but not limited to web pages, can be analyzed to identify characteristics of the content. Historical content requests associated with users and/or other user-specific information can be analyzed to identify user interests. Content can then be provided or recommended to users based on content characteristics and user interests. The content that is provided or recommended may be trending content that has at least a threshold level of popularity, became popular recently, and/or is associated with a threshold level of social network activity.

17 Claims, 5 Drawing Sheets

IDENTIFICATION OF TRENDING CONTENT USING SOCIAL NETWORK ACTIVITY AND USER INTERESTS

BACKGROUND

Computing devices, such as personal computers, tablet computers, mobile phones, or other devices, often request content from other computing devices over a network. In a common application, the computing device operated by a requesting user is referred to as the client, and the computing device or system operated by the content provider that responds to the request is the server. A client and server may communicate over an intranet, the Internet, or any other communication network. Clients receive and process content (e.g., web pages) from content servers, either directly or through intermediary systems, such as proxy servers.

Users of client devices often wish to access web pages and other content items that are new and/or popular. For example, users may use search engines, news sites, and the like to access content of interest. However, traditional search engines typically provide results based on relevance, embedded links, or some "ranking" or "score" that may or may not factor in popularity or timeliness. As an alternative to using search engines, users may access various services that provide a more targeted listing of content that is popular. Such services may determine the popularity levels of particular web sites, web pages, search terms, and topics using various sources of behavioral data, such as search engine traffic, blog posts, social network activity, and the like.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
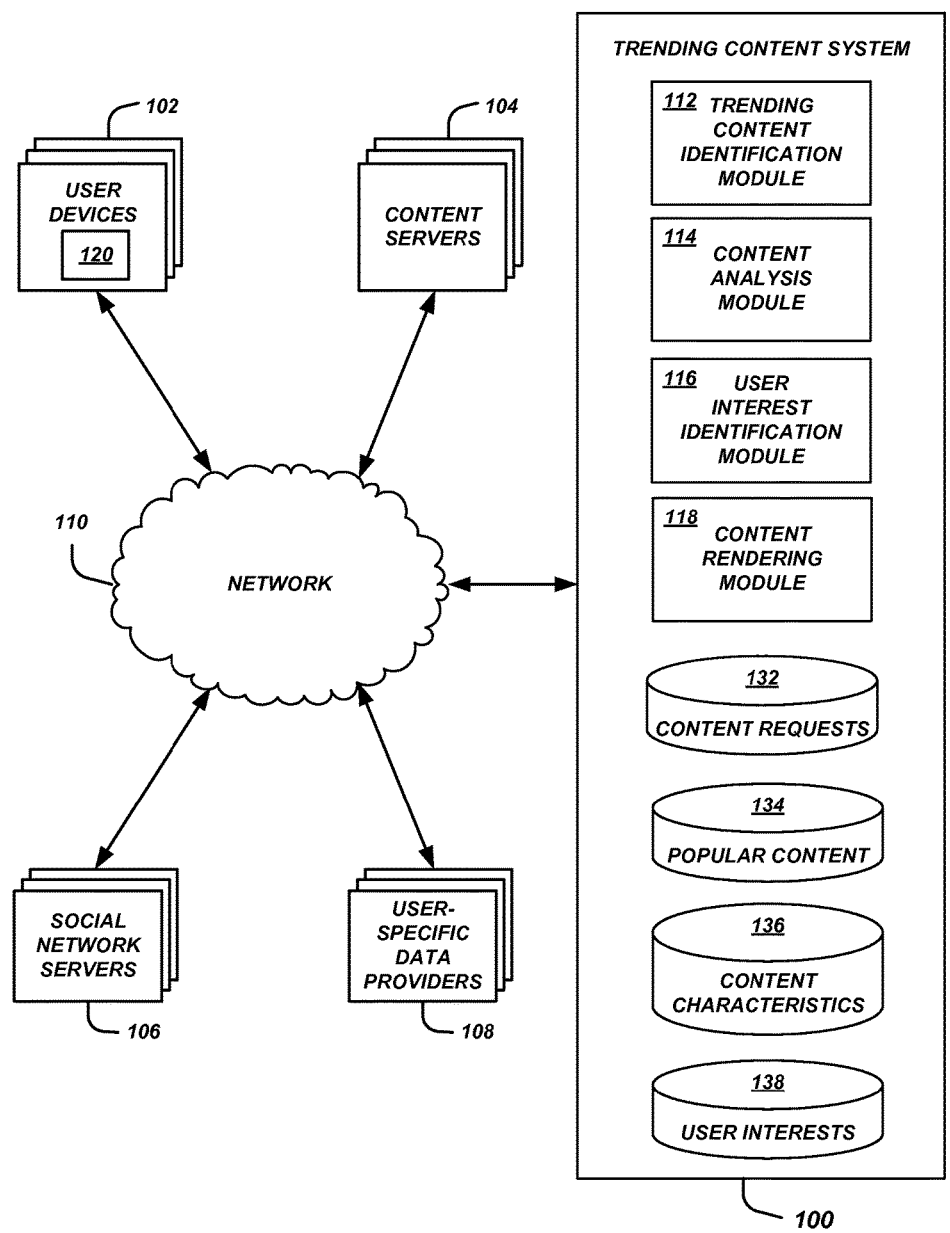
FIG. 1 is a block diagram of an illustrative network environment including a centralized trending content service according to some embodiments.

The present disclosure is directed to a system that identifies and provides trending content (or recommendations of trending content) to users. The trending content may be web pages, articles, documents, and other network-accessible content items that have at least a threshold level of popularity (e.g., based on a number of requests for the content, links to the content, etc.). However, rather than identifying content that is simply popular, the system may identify content with a popularity that is increasing at a faster rate than the popularity of other content, even if the other content is more popular overall. In addition to calculating the rate at which the popularity of content is increasing, the system may also take social signals into account when identifying or selecting trending content (e.g., sharing of links, application of "likes" and other tags, commentary regarding the content, and/or other social network interactions related to the content). Furthermore, the system can use information about content previously requested or accessed by individual users and other user-specific information (e.g., shopping histories, service usage, etc.) to identify the interests of the respective users. The system can then provide trending content that is directed to the interests of individual users.

Some conventional services provide listings of popular content based on requests, links, search engine queries, tracking cookies, and the like. While such services are useful, they often fail to provide a sufficiently reliable, useful, and timely indication of the topics and content items that are currently gaining in popularity. For example, content items that are among the most popular content items (e.g., as measured by requests) may be well-known to users, even when the popularity determination is limited to a recent period of time (e.g., the immediately-preceding week, day, hour, etc.). A listing of such content items may therefore not be valued by users wishing to access content that they have not yet seen but which is becoming increasingly popular. In addition, such popular content may not be tailored to the interests of individual users.

Some aspects of the present disclosure relate to identifying trending content using a combination of the rate at which individual content items are increasing in popularity and the degree to which the content items have been the subject of commentary and/or social network interactions. By incorporating such social signals into the trending content identification process, content can be identified that is not only increasing in popularity overall (e.g., based on requests, views, etc.), but is also of interest from a social perspective. The social signals can help to focus the results on articles, pages, and information that are engaging or otherwise likely to be of interest to users (e.g., topical news articles, entertaining multimedia), while filtering out content that may be spiking in popularity but that is nevertheless uninteresting or undesirable in a broader social sense (e.g., links to search engines, illicit or malicious content). In some embodiments, a trending content service may access information from social networks that track the number of times individual content items have been shared, tagged (e.g., "liked"), commented upon, and the like. For example, the trending content service may access information about such social interactions associated with the content item by using an application programming interface ("API") exposed by the social network. The social interaction information may then be factored into a score or other determination used to identify and/or select trending content. Thus, content that has been the subject of extensive social network commentary and interaction can be given a higher score and potentially provided or recommended to users over other content that fails to provoke social commentary and sharing among friends even though it is more popular overall or is gaining in popularity at a faster rate.

Additional aspects of the present disclosure relate to developing taxonomies for categorizing content items, and using the taxonomies to identify trending content that may be of interest to individual users. In some embodiments, machine learning algorithms may be used to analyze content items and identify various characteristics of the content items, such as the broad category to which an individual content item belongs (e.g., sports, news), the concept to which the content item relates (e.g., professional football, local politics) keywords within the content item (e.g., individual player names, individual politicians) and/or sentiments about the keyword, concept, etc. (e.g., positive commentary about a player, negative commentary about a politician). The content items requested by individual users can be analyzed to identify particular concepts, keywords, sentiments, etc. of interest to the individual users. A trending content service can then provide or recommend content that is both trending and also targeted to the particular interests of the individual users. For example, a user may have a history of viewing content about a particular sports team. The trending content service can provide or recommend to the user trending articles about that sports team, even if other articles are currently trending at a higher rate (e.g., articles about local politics have a higher overall trending score than the articles about the sports team, but the articles about the sports team are provided instead because the trending content service has determined that the user is more interested in the sports team than local politics). In some embodiments, other user-specific information may be used instead of, or in addition to, historical content requests when identifying user interests. For example, a trending content service may have access to information about a user's shopping history, usage of a network-based service (e.g., a streaming movie service, a browser extension such as a toolbar, or a cloud-based computing service), and the like. Such information may be used to identify particular user interests (e.g., the user is interested in a particular product because the user has purchased the product, or the user is interested in certain types of movies because the user has often viewed such movies). The trending content service can then provide content and/or content recommendations based on interests derived from such user-specific information.

Although aspects of the embodiments described in the disclosure will focus, for the purpose of illustration, on specific examples of content items, methods of determining popularity and rate of popularity increase of the content items, methods of determining user interests, and methods of categorizing content items, one skilled in the art will appreciate that the techniques disclosed herein may be applied to any number of services, process, or applications. Various aspects of the disclosure will now be described with regard to certain examples and embodiments, which are intended to illustrate but not limit the disclosure.

Example Trending Content Delivery Environment

FIG. 1 shows an example network environment in which features of the present disclosure can be implemented according to some embodiments. The example network environment includes a trending content system 100 (also referred to as a "trending content service") and various user devices 102 (also referred to as "user computing devices"), content servers 104, social network servers 106 and user-specific data providers 108 in communication via a communication network 110 (also referred to as a "network"). The network 110 may be a publicly accessible network (such as the Internet) of linked networks, possibly operated by various distinct parties. In other embodiments, the network 110 may include a private network, personal area network, local area network, wide area network, cable network, satellite network, cellular telephone network, etc., or combination thereof, each with or without access to and/or from the Internet.

The trending content system 100 can be a computing system configured to identify and select content items (e.g., content pages hosted by content servers 104) that are, recently were, or are expected to be trending. As described in greater detail below, the identification of trending content may be based on a rate at which the popularity of the content is changing, social networking interactions associated with the content (e.g., determined using information obtained from social network servers 106), and the like. Furthermore, user interests may be identified, and trending content may be selected based on the specific interests of the user to which the trending content is to be delivered or recommended.

In some embodiments, the trending content system 100 can be a server or group of servers that may be accessed via the network 110. The trending content system 100 can include a number of components to provide various features described herein, such as a trending content identification module 112 to identify trending content items, a content analysis module 114 to analyze and categorize content items, a user interest identification module 116 to identify user interests, and a content rendering module 118 to retrieve and render content so that screenshots can be generated and/or the rendered content can be provided to user devices 102. The trending content system 100 may also include various data stores, such as a content requests data store 132 to store information about content requested by user devices 102, a popular content data store 134 to store information about the first time individual content items were determined to be popular, a content characteristics data store 136 to store information about the categories, concepts, keywords, sentiments, and/or other characteristics of content items, and a user interests data store 138 to store information about the interests of specific users.

The trending content system 100 may be a single computing device, or it may include multiple distinct computing devices, such as computer servers, logically or physically grouped together to collectively operate as a server system. The components of the trending content system 100 can each be implemented as hardware, such as a server computing device, or as a combination of hardware and software. In addition, the components of the trending content system 100 can be combined on one server computing device or separated individually or into groups on several server computing devices. In some embodiments, the trending content system 100 may include additional or fewer components than illustrated in FIG. 1. In some embodiments, the features and services provided by the trending content system 100 may be implemented as web services consumable via a communication network 110. In further embodiments, the trending content system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user computing devices 102 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors and a computer-readable memory storing an executable browser application 120 (also referred to as a "browser"). As described in greater detail below, a user of a user computing device 102 may use the browser 120 to request, obtain, view, and interact with content such as content pages, multimedia presentations, images, videos, and other documents or files. For example, a browser 120 may obtain content from a content server 104, either directly or via a proxy or other intermediary system, such as the trending content system 100. In addition, the browser 120 may obtain trending content or recommendations of trending content from the trending content system 100.

Individual content servers 104 can correspond to a logical association of one or more computing devices for hosting content and servicing requests for the hosted content over the network 110. For example, a content server 104 can include a web server component corresponding to one or more server computing devices for obtaining and processing requests for content items (such as content pages, multimedia presentations, or other documents or files) from a user device 102, the trending content system 100, or other devices or service providers. In some embodiments, the content servers 104 may be associated with a CDN service provider, an application service provider, etc.

The social network servers 106 can correspond to a logical association of one or more computing devices for hosting social networks (e.g., Facebook), bulletin boards, weblogs (also known as "blogs"), microblogs (e.g., Twitter), so-called "rich site summary" or "really simple syndication" feeds (also known as "RSS" feeds), and the like. Generally described, a social network server 106 or system may be any system that enables users to establish personal connections with other users, allows users to share information about themselves and each other, provides features for one-on-one or group discussion, etc. In some embodiments, a social network server 106 can include a web server component corresponding to one or more server computing devices configured to, among other things: obtain, process, and transmit messages among users; host commentary and conversations; provide links and recommendations; and/or tag content, messages and posts. For example, individual users may post links to content of interest, other users (e.g., friends or the general public) may access the linked content, forward or tag the links, etc. In a typical scenario, users will share, access, comment upon and/or tag content if it is new and interesting. Accordingly, content that has been shared, accessed, commented upon and/or tagged a large number of times in a given period of time may be both popular and interesting in a social sense, rather than simply being popular.

The user-specific data providers 108 can correspond to various third party services and/or services integrated or associated with the trending content system 100. The services may include those used by individual users of user computing devices 102, such as shopping web sites, streaming movie services, cloud-based service providers, and the like. Each service may include a logical association of one or more computing devices for hosting the corresponding service. Users may connect to individual services via the network 110 to consume the service offerings. The services may store usage and/or profile data on a user-specific basis, and can provide that data to the trending content system 100 for use in determining user interests. For example, a user-specific data provider 108 may be a streaming movie service, and information about the movies typically watched by a particular user may be provided to the trending content service 100. As another example, a user-specific data provider 108 may be a shopping web site, and information about the items browsed and/or purchased by the user can be provided to the trending content service 100. The trending content service 100 can then use that information to determine specific user interests (e.g., certain types of movies or products, but also broader categories of interests such as sports, politics, healthy living, fashion, etc.). The trending content service 100 can then select trending content that is applicable to the user's interests and provide that content to the user.

Example Process for Identifying Trending Content

Figure 2:
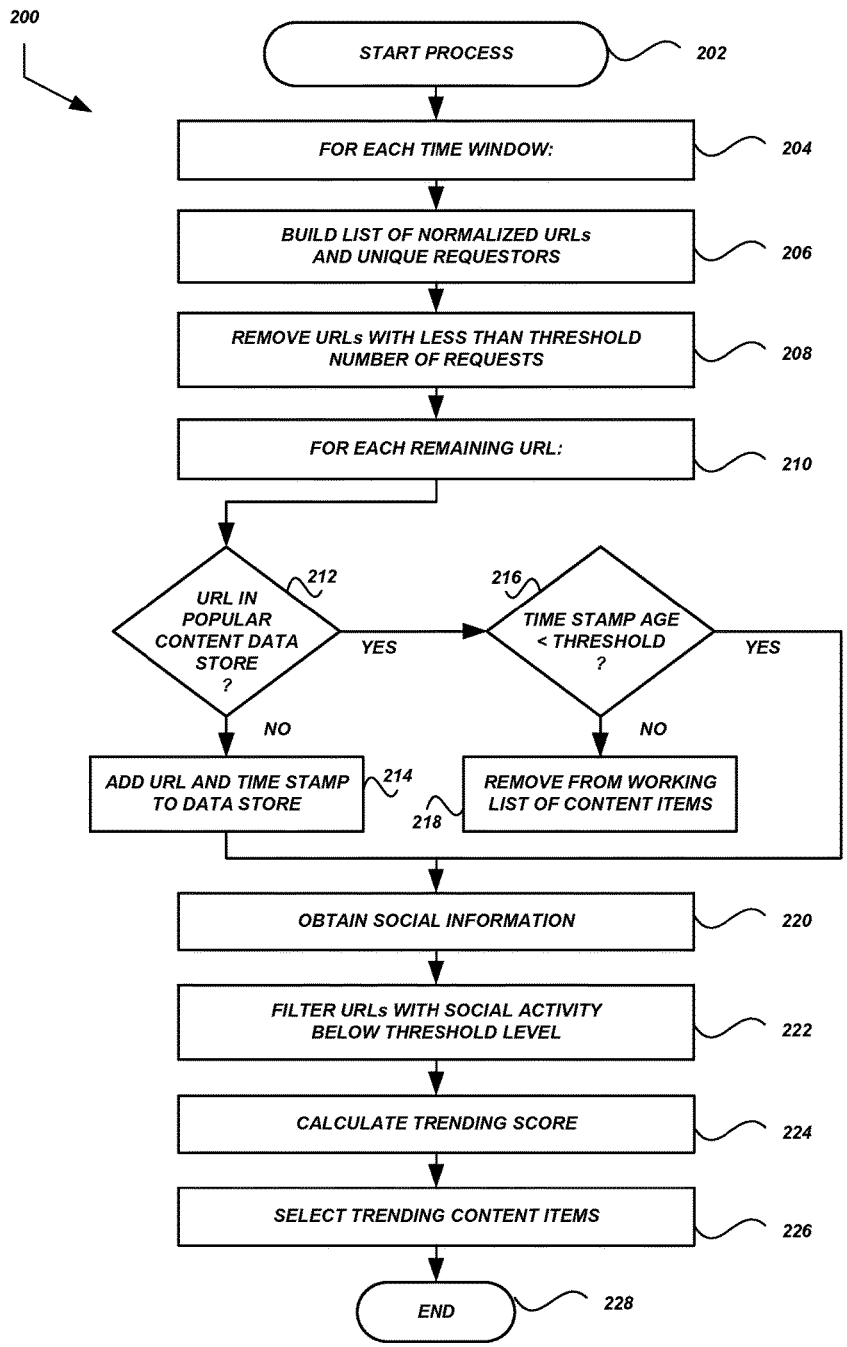
FIG. 2 is a flow diagram of an illustrative process for identifying and providing trending content.

FIG. 2 illustrates a sample process 200 that may be used by a trending content identification module 112 or some other module or component of the trending content system 100 to identify trending content items and provide those content items (or recommendations thereof) to users. Advantageously, the identification of trending content may be based at least partly on information obtained from social network servers 106 or on other information indicative of content that is interesting in a social sense, rather than simply being popular or increasing in popularity.

The process 200 begins at block 202. For example, the process 200 may begin automatically upon initialization of the trending content identification module 112, on-demand in response to a request or command of a system administrator or technician, or in response to some other event. For convenience, many portions of the process 200 will be described as initiated by or otherwise involving the trending content identification module 112. However, it will be appreciated that many of such operations can be initiated by or otherwise involve some other module or component of the trending content system 100.

At block 204, the trending content identification module 112 can initiate a process for each predetermined or dynamically determined time interval. For example, the trending content identification module 112 may proceed to identify trending content on a daily basis, every x hours (where x is some non-negative number), every x minutes, etc. Thus, the process 200 (or portions thereof) may be repeated on a continuous or selective basis until the process 200 is terminated by a technician or until the occurrence or observation of some other event.

At block 206, the trending content identification module 112 can build a list of unique content identifiers, such as uniform resource locators ("URLs") or other network addresses, of content items that have been requested by user computing devices 102. In some embodiments, the user computing devices 102 may use the trending content system 100 as a proxy, and some or all content requests originating from the user computing devices may be routed through or serviced via the trending content system 100. Thus, the trending content system 100 may have access to information about every content item (or some subset thereof) requested by the user computing devices 102 for the currently applicable period of time. In other embodiments, user computing devices 102 may send information about content requests to the trending content system 100, even though the trending content system 100 does not serve as a proxy or other intermediary system for those user devices 102.

Figure 3:
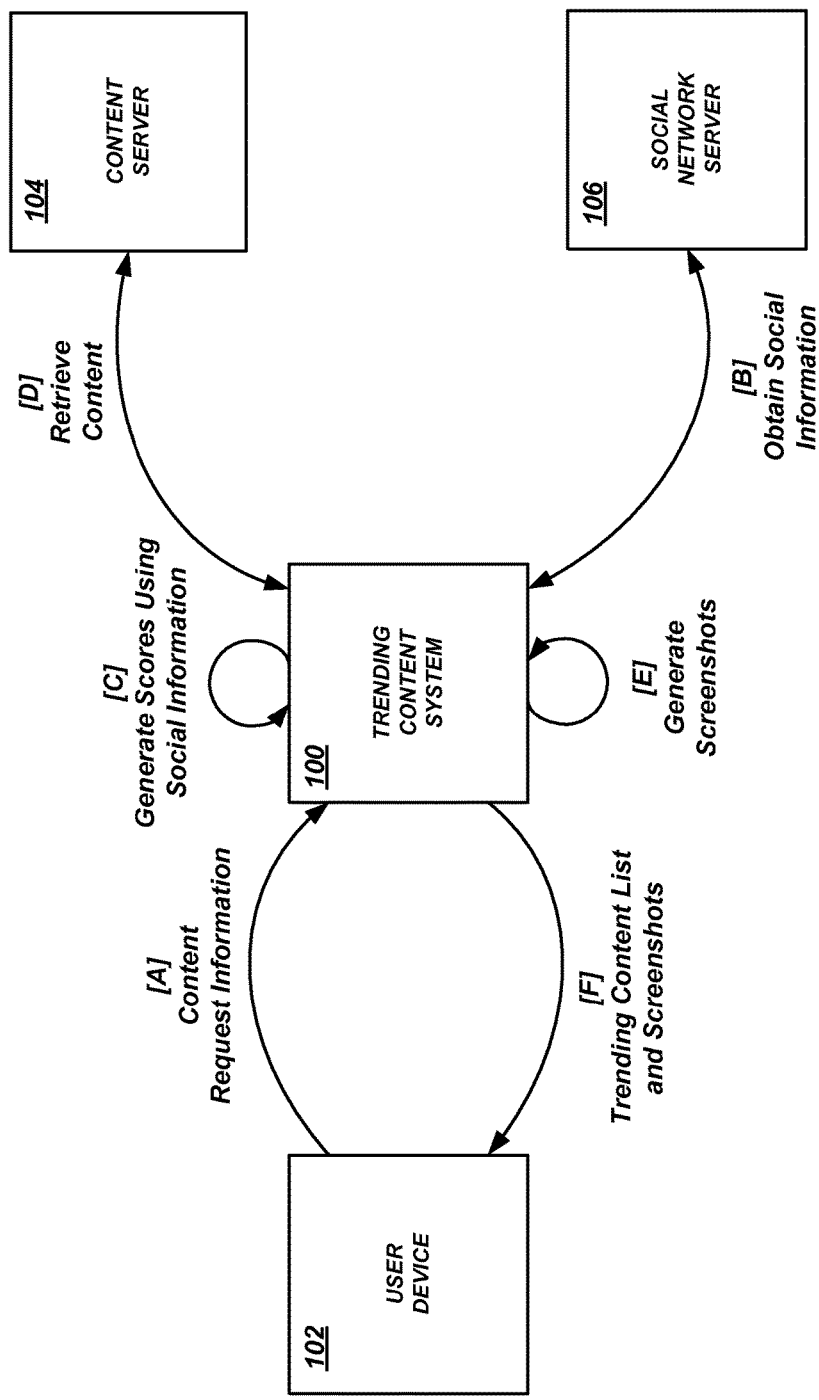
FIG. 3 is a block diagram of illustrative interactions and data flow between user devices, a trending content service, and various other entities according to some embodiments.

FIG. 3 illustrates example interactions and data flows between the trending content system 100 and various user devices 102, content servers 104 and social network servers 106. As shown, the trending content system 100 can obtain content request information from the user devices 102 at [A]. As described above, the content request information may be provided during a proxy processing flow in which the trending content system 100 acts as an intermediary between the user devices 102 and content servers 104, or the content request information may be provided separately from actual requests for content initiated by the user deices 102. Information about the content requests may be stored by the trending content system 100 in the content requests data store 132. For example, a URL of the requested content, a timestamp for the initiation or fulfillment of the request, and a unique identifier of the user or user device 102 from which the request initiated may be stored in the content requests data store 132. The trending content system 100 can then use this information, as described in greater detail below, to determine which content items are the most popular (e.g., have been requested the greatest number of times) for the current period. In addition, the trending content system 100 can determine which content items are increasing in popularity in comparison with previous periods by computing a difference or rate of change in the number of requests.

In many cases, a URL for a requested content item may include information that is extraneous to the identification or location of the requested content item. For example, URLs often include query strings or other parameters that are used by content servers 104 to track users and exchange information with user devices 102. Thus, the same content item may potentially have a different URL associated with it for each request, which can make it seem as though many different content items have each been requested a single time, even though a single content item has been requested a large number of times in total. To compensate for this potential miscalculation, the trending content identification module 112 can determine the actual identity of each requested content item by, e.g., identifying a "canonical URL" or some other unique identifier for each of the requested content items. In some embodiments, the canonical URL may be the least amount of information from the URL that uniquely identifies the content item itself without identifying the requesting user, session, etc. Thus, a first request for a content item at URL "http://www.abc.xyz/index.html?a=1&b=2" and a second request for a content item at URL "http://www.abc.xyz/index.html?a=3&b=4" may both be properly identified as requests for the content item associated with the canonical URL "http://www.abc.xyz/index.html." Identifying the canonical URL for any content item may include the use of pattern-matching functions, such as regular expressions. Because different content servers 104 may use different hierarchies or naming conventions for their content items, different regular expressions may be used to determine the canonical URL for content items from the different content servers 104. For example, content items from domain "abc.xyz" may be processed using a first regular expression (or some other function), and content items from domain "foo.xyz" may be processed using a second regular expression (or some other function).

In some embodiments, the trending content service may store information about the content at the URLs rather than, or in addition to, the URLs themselves. For example, the exact same article may be available from multiple (e.g., two or more) different content servers 104 or domains (e.g., Associated Press included in web pages hosted by many different news web sites). The trending content service 100 may build a list of unique content and a corresponding number of requests, rather than a list of unique URLs. The trending content service 100 may identify unique content by extracting a candidate portion of requested content pages, such as the content from the <div> tag with the largest amount of text, content identified by some embedded identifier, etc. A hash can then be computed for the content and compared to the hash computing for content extracted from other content pages in order to identify matches. In some embodiments, other techniques may be used, such as machine learning algorithms that determine the likelihood that two or more content items contain essentially the same content even if portions of the content are not identical (as would typically be required by hashing algorithms). In further embodiments, entire content pages or portions thereof may be stored for future identification of popular content items across domains or content servers 104. Thus, a definitive determination may be made as to when certain content was seen for the first time, or first became popular. Such determinations may be useful in subsequent portions of process 200 described below.

Returning to FIG. 2, at block 208 the trending content identification module 112 can filter or remove, from the list built above at block 206, those content items that do not meet a threshold level of popularity. For example, the trending content identification module 112 may only proceed through the remainder of process 200 with the URLs that have been requested a threshold number of times in the current period. The threshold may be predetermined or dynamically determined, such as an administrator-configurable number of requests, a percentage of requests, a relative ranking, etc. By limiting the subsequent trending content identification process to only those content items associated with a threshold level of popularity, the trending content system 100 can avoid providing content items whose popularity is increasing at a very high rate, but which are not popular using any accepted or customary definition of popularity. For example, a particular content item may have been requested once in the previous time period (e.g., 4 hours) and 100 times in the current time period (e.g., the next 4 hour time period). Such a content item is experiencing a tremendous increase in overall requests when expressed as a ratio or percentage. However, the content item is not popular in an absolute sense, and users would likely be surprised to be recommended such a content item over other content items that have been requested thousands or millions of times.

At block 210, the trending content identification module 112 can iterate through each remaining content item in the listing to determine whether the content item has been previously identified as popular. For example, at decision block 212, the trending content identification module 112 can determine whether the content item has previously meet or exceeded the minimum popularity threshold described above. In some embodiments, the trending content system 100 may store, in the popular content data store 134, a listing of each content item that has met or exceeded the minimum popularity threshold (or was otherwise determined to be popular), together with a time stamp or other indication of the first time the content item was determined to be popular. If the content item has not been previously determined to be popular, it can be added at block 214 to the popular content data store 134 with a time stamp for the current time. If the content item has been previously determined to be popular, the process 200 can proceed to decision block 216.

At decision block 216, the trending content identification module 112 can determine how long ago the content item was first determined to be popular. For example, the trending content identification module can inspect the time stamp associated with a content item in the popular content data store 134. If the time stamp is within a predetermined or dynamically determined window of time prior to the current time, the process 200 can proceed to block 220. Otherwise, if the time stamp is not within the window of time, then the content item is not new (or is not newly popular), and the content item can be removed from the working list of content items at block 218. By using only content items that have recently become popular, the trending content system 100 can ensure that it is providing trending content (or recommendations to content) that users have likely not seen before (e.g., the users are viewing the content before or around the time it first reaches widespread popularity).

At block 220, the trending content identification module 112 can obtain social information for the current content item. As shown in FIG. 3, the social information may be obtained from one or more social network servers 106 at [B], such as servers that host social networks, bulletin boards, blogs, microblogs, RSS feeds, and the like. The social information may include data regarding the number of times a particular content item has been the subject of or otherwise associated with certain social interactions, such as sharing, tagging (e.g. "liked"), commenting, and the like. In some embodiments, the trending content identification module 112 may obtain the social information from a particular social network server 106 via an API exposed by the social network server 106. The trending content identification module 112 may request social information for a particular content item (e.g., "http://foo.xyz"), potentially for only the period of time that corresponds to the period of current time window in block 204. In addition or alternatively, the trending content identification module 112 may request social information in general, and may receive a list of the most active content items (e.g., the content items that have been the subject of the most social interactions). In some embodiments, rather than providing information about particular content items, the social network server 106 may provide information about topics or keywords. The trending content identification module 112 can then use the social information for the topics or keywords that apply to the current content item. One illustrative method for determining topics, keywords, and other characteristics of content items is described below with respect to FIG. 5.

At block 222, the trending content identification module 112 can filter or remove from the current list of content items those content items that are not determined to be socially popular. In some embodiments, the trending content identification module 112 can determine which content items are not associated with a minimum threshold number of social interactions, and remove those from the current list of content items. Similar to removing (or otherwise not proceeding with) content items that have not reached a minimum measurement of popularity based on requests, removing (or otherwise not proceeding with) content items that have not reached a minimum measurement of social popularity can help prevent the trending content system 100 from providing or recommending content that is not likely to be interesting to users.

At block 224, the trending content identification module 112 can determine a score for individual content items, as shown in FIG. 3 at [C]. The score can be used to rank and select individual content items to provide or recommend to users. The score for an individual content item can be based on the popularity of the content item, the amount of elapsed time since the content item was first determined to be popular, the rate at which the popularity of the content item is increasing, the social popularity of the content item, other factors, or some combination thereof.

In some embodiments, the score for a content item may be calculated based at least in part on equation [1], below:

$$\text{score}=(\text{weight}_{curr}-\text{weight}_{prev})/\text{weight}_{prev} \qquad [1]$$

where $\text{weight}_x$=the number of requests for the content item in time period x, divided by the total number of content requests for all content items in the time period x. The weights are used instead of the raw number of requests to normalize the data across time periods because the total number of requests may be significantly different from one time period to the next. Thus, in this example, score corresponds to the rate at which popularity of the content item has changed from the previous period to the current period. A final score or ranking for the content item may be calculated by adding an exponentially decayed score for the previous time period to the score for the current time period. The final score or ranking for the content item can therefore correspond to the current popularity and a "hangover" from the previous popularity (which in-turn was calculated from its previous popularity, exponentially decayed, and so on).

In some embodiments, the score for a content item may be calculated based at least in part on equation [2], below:

$$\text{score}=(\text{social}_1*\text{social}_2 \ldots *\text{social}_n)/(T_{now}-T_{first})^{\wedge}g \qquad [2]$$

where $\text{social}_x$=the social popularity score from the $x^{th}$ social network server 106, $T_{now}$=the current time, $T_{first}$=the first time at which the content item was determined to be popular, and g=a predetermined constant (e.g., "gravity") designed to reduce the score for content items more quickly as $T_{now}-T_{first}$ increases, ensuring that the newest content items have higher overall scores than the oldest content items unless an older content item has exceptionally high social score(s). The social scores may be provided by the social network servers 106 themselves, may be calculated from information obtained from the social network servers 106, or may be based on some combination thereof. Illustratively, $\text{social}_1$ may be based on the sum of the number of shares+tags+ comments associated with a content item, $\text{social}_2$ may be limited to the number of content shares alone, etc. In some embodiments, additional or alternative variables and/or constants may be used in equation [1], or a different equation or method altogether may be used to score and/or rank content. For example, the predetermined constant g used to decay older content may be replaced with a dynamic calculation or omitted altogether.

At block 226, the trending content identification module 112 can select the trending content to be provided or recommended to user devices 102. In some embodiments, the trending content identification module may select the top x highest-scoring content items (where x is some non-negative number) based at least partly on the scores calculated above. A list of the selected content items can be generated and provided user devices 102 or otherwise made available to the user devices 102. The process 200 can terminate at block 228.

As shown in FIG. 3, a screenshot of each of the selected trending content items (or some subset thereof) can be generated and provided to the user devices 102 (e.g., at [F], either with the list of selected trending content items or as a separate transmission). The screenshots may be generated by the content rendering module 118. For example, the content rendering module 118 may obtain a copy of a trending content item from a corresponding content server 104 at [D], process the content as it would be processed by a browser 120 of a user device (or process the content in some other way) to obtain a view of the content, and then generate a screenshot from the processed view of the content item at [E]. The screenshot may be a thumbnail or low-resolution view of the content item, or it may be a substantially full resolution view.

Although the process 200 is described above in the context of specific processing flows and examples, the description is illustrative only and is not intended to be limiting. In some embodiments, additional or alternative operations may be performed. For example, the URLs and time stamps in the popular content data store 134 may be periodically purged or modified so that individual URLs are not permanently excluded from ever being selected again after their time stamp falls outside the window described above with respect to decision block 216. Thus, the first time a content item is determined to be popular after its information was modified or purged from the popular content data store 134, the content item may be re-added or modified to include a new time stamp, and may therefore be available for selection as a trending content item. The frequency or schedule at which individual URLs are purged or modified may be user-configurable or automatically determined. As another example, the trending content determinations may be regional, based on the locale in which each content request was initiated. Information about the locale may be included in content request information so that the process 200 can be run separately for each separate locale.

Example Process for Selecting Trending Content Based on User Interests

Figure 4:
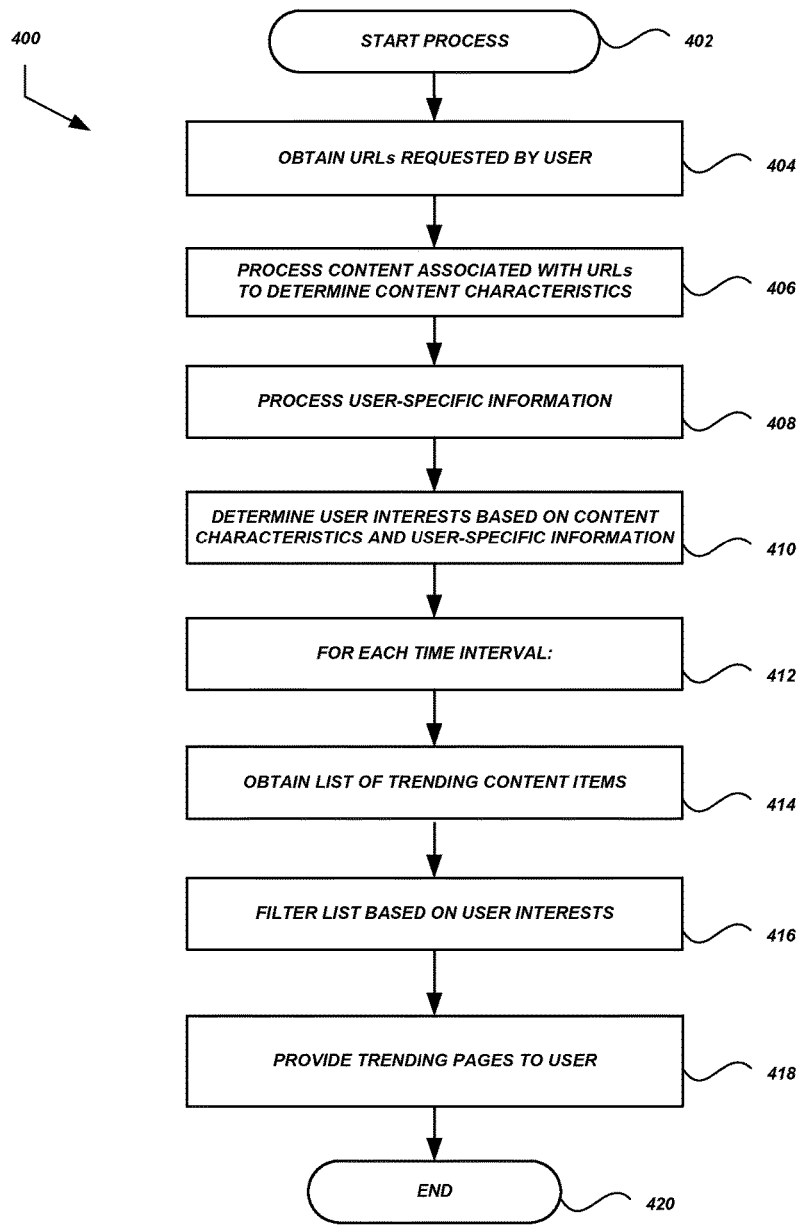
FIG. 4 is a flow diagram of an illustrative process for identifying user interests and providing trending content targeted to those interests.

FIG. 4 illustrates a sample process 400 that may be used by a trending content identification module 112, user interest identification module 116, and/or some other module or component of the trending content system 100 to identify user interests and select trending content items applicable to those interests for the corresponding users. Advantageously, the identification of user interests may be based at least partly on an analysis of content requested by the users and/or other user-specific information.

The process 400 begins at block 402. For example, the process 400 may begin periodically, upon establishment of a browsing session with the trending content service 100 by a user device 102 associated with a particular user, upon receipt of a request for trending content initiated by a particular user or user device 102, or in response to some other event. For convenience, many portions of the process 400 will be described as initiated by or otherwise involving the user interest identification module 116 and/or the trending content identification module 112. However, it will be appreciated that many of such operations can be initiated by or otherwise involve some other module or component of the trending content system 100.

At block 404, the user interest identification module 116 can obtain a listing of URLs requested by the user. As described above, content requests may be routed through the trending content system 100 as an intermediary, or information about content requests may be provided to the trending content system 100 separately from the actual content requests. The user interest identification module 116 may normalize the URLs or process them to identify canonical URLs, as described in greater detail above. In some embodiments, the user interest identification module 116 may obtain a listing of unique content requested by the user rather than the URLs requested by the user, as described above.

Figure 5:
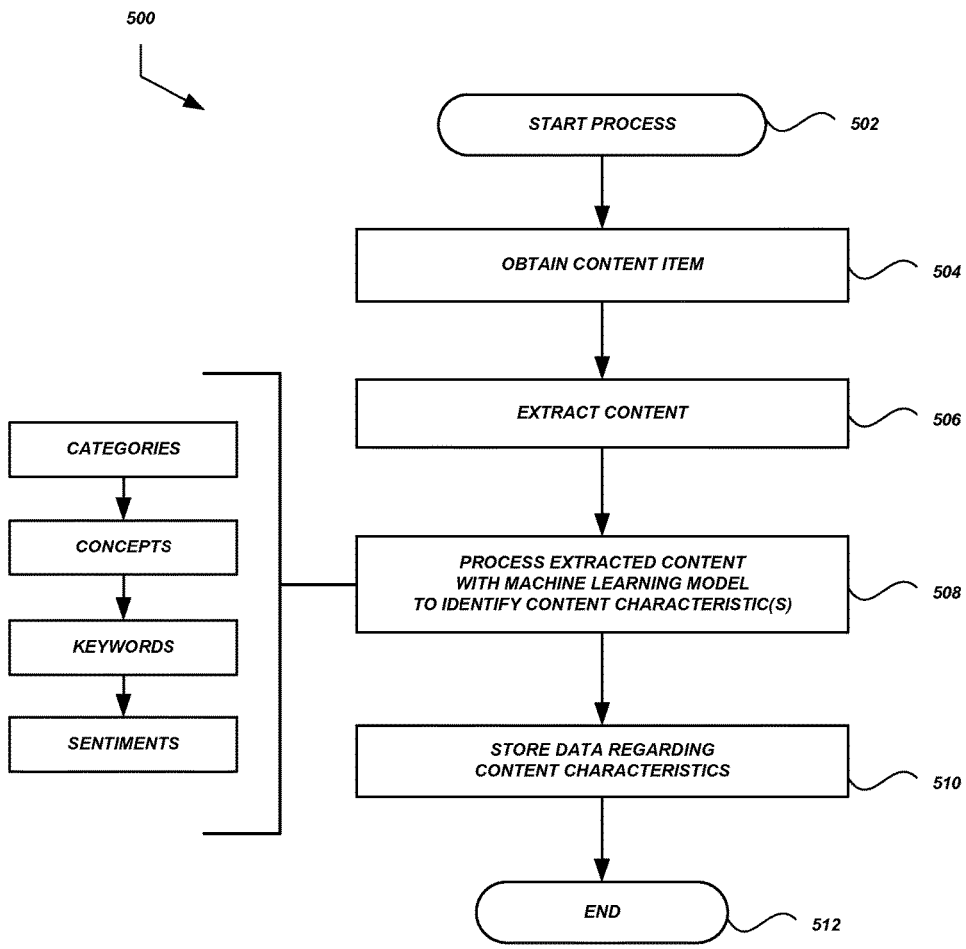
FIG. 5 is a flow diagram of an illustrative process for identifying content characteristics.

At block 406, the user interest identification module 116 can process the content requested by the users to determine the characteristics of content most requested by the user. FIG. 5, described in greater detail below, shows an illustrative process for processing content to determine content characteristics useful in making such user interest determinations. In some embodiments, the content may be processed to identify a hierarchical taxonomy of content characteristics, such as (from broader to more-specific) categories, concepts, and keywords. In addition, sentiment about some or all of the levels of the hierarchy can be determined (e.g., whether the content requested by a user is typically positive, negative, or neutral regarding a particular category, concept and/or keyword).

At block 408, the user interest identification module 116 can process information obtained from one or more user-specific data providers 108. The user-specific information may be used to determine user interests based on user actions other than (or in conjunction with) content requests. The particular user interests determined using such user-specific information may be cross-referenced or otherwise correspond to the content characteristics determined above. For example, user-specific shopping information may be used to determine particular products that a user has browsed or purchased, and such information may correspond to specific content-related categories, concepts, keywords, entitlements, etc.

At block 410, the user interest identification module 116 can determine user interests based at least partly on the content processing results and/or user-specific information processing results produced above and described in greater detail below. In some embodiments, the user interest identification module 116 may count the instances of particular content-related categories, concepts and keywords in order to determine an individual user's greatest area(s) of interest. In some embodiments, one or more machine learning algorithms may be used to process the results produced above and classify individual users as being interested in one or more areas. For example, topics, categories, keywords, individual content items, and other indicators of user interest may be clustered into groups, and the user interest identification module 116 may determine which clusters the user is most interested in (e.g., which types of content items the user requests most, which types of products the user browses or purchases, etc.).

At block 412, the trending content identification module 112 can begin identifying and selecting trending content items based on the user interests identified above. For example, the trending content identification module 112 may, for each predetermined or dynamically determined time interval, obtain a listing of trending content items at block 414 as described in greater detail above. At block 416, the trending content identification module 112 can filter the listing or select individual trending content items based on a particular user's identified interests. Illustratively, each content item known to the trending content service 100 may have been processed to determine various characteristics, such as the particular categories, concepts, keywords, and sentiments, if any, that are associated with the content item. Then, using information about a particular user's interests, the highest scoring or ranking content that is relevant to the user's interests may be chosen (e.g., based on a match in category, concept, keyword, sentiment, some combination thereof, etc.). The content can then be provided to the user at block 418. Illustratively, the content may be provided for display in a tab or window of the browser 120 executing on the user device 102, in another user interface display area outside of the browser 120 (e.g., a notification area or widget), or the like.

In some embodiments, the trending content system 100 may be part of (or associated with) a provider of user devices 102 and/or operating systems for user devices 102. Thus, the trending content system 100 may be able to access portions of the user device 102 that would normally be unavailable to providers of network-based content, such as home screens, alternative views integrated into or provided by the operating system, etc. The user device 102 may present a notification or cue to the user that trending content has been obtained, and the user may then access the listing of trending content, view screenshots, initiate a request for a full version of a content item, etc., all without using a browser application 120.

As will be appreciated, some or all of the process 400 may be repeated for each desired time interval, user of the trending content system 100, etc. The process 400 can terminate at block 420.

Example Process for Identifying Content Characteristics

FIG. 5 illustrates a sample process 500 that may be used by a content analysis module 114 and/or some other module or component of the trending content system 100 to identify characteristics of content that is requested by users or otherwise known to the trending content system 100. Advantageously, the identification of content characteristics may be based on one or more machine learning models trained to identify hierarchical taxonomies of content characteristics, such as (from broadest to most specific) categories, concepts and keywords. In addition, sentiments may be determined for some or all levels of the hierarchy.

The process 500 begins at block 502. For example, the process 500 may begin automatically during portions of processes 200 and/or 400, described above. For convenience, many portions of the process 500 will be described as initiated by or otherwise involving the content analysis module 114. However, it will be appreciated that many of such operations can be initiated by or otherwise involve some other module or component of the trending content system 100.

At block 504, the content analysis module 114 can obtain the content item at a particular URL, such as a URL requested by a user or a URL otherwise known to the trending content module.

At block 506, the content analysis module 114 can extract the relevant content from the content item at the URL. For example, the content to be analyzed may be identified by a particular tag within the content item, may be the largest block of text within the content item, or may be identifies using some other analysis. In some embodiments, a machine learning model trained to identify relevant portions of content items may be used to extract the content from the current content item.

At block 508, the content analysis module 114 can process the extracted content using a machine learning model trained to identify content characteristics of interest. In some embodiments, the content characteristics may be part of a hierarchy: category may define the broadest level of the hierarchy, and therefore all content known to the trending content system 100 may be categorized into one or more of a relatively small number of categories; keywords may be the most specific level of the hierarchy, and therefore there may be a relatively large number of unique keywords identified for the content known to the trending content system 100. The hierarchy may include any number of intermediate levels. For example, an intermediate level may be "concept," which is more specific than category (e.g., a single category may encompass multiple concepts), but which is broader than keyword (e.g., a single concept may encompass multiple keywords). In one specific, non-limiting example, the hierarchy may include categories such as sports and news, concepts such as professional football and local politics, and keywords such as individual player names and individual politicians. In addition to hierarchical taxonomies, the content analysis module 114 may use a machine learning model to identify sentiments about particular keywords, concepts, etc.

At block 510, the content analysis module 114 can store data regarding the content characteristics of the current URL. For example, the URL and identifiers of the individual content characteristics (or the names of the characteristics themselves) may be stored in the content characteristics data store 136. Illustratively, the trending content system 100 may use the data when identifying trending content that matches or is relevant to the interests of a particular user. In some embodiments, the trending content system 100 may provide trending content for individual categories, concepts, keywords, and the like on demand or otherwise independent of user-specific interest determinations. For example, users may wish to view the trending content for a particular category, and can request a listing of trending content in the category from the trending content system 100. As another example, the trending content system 100 may publish listings of trending content broken down according to the hierarchical taxonomy used to identify content characteristics. The process 500 can terminate at block 512.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration.

Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 200, 400 and 500 described with respect to FIGS. 2, 4 and 5 may be embodied in a set of executable program instructions stored on one or more non-transitory computer-readable media, such as one or more disk drives or solid-state memory devices, of a computing system with which the trending content system 100 is associated. When a process 200, 400 and/or 500 is initiated, the executable program instructions can be loaded into memory, such as RAM, and executed by one or more processors of the computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising one or more physical computing devices, the system configured to at least:
    obtain content request data regarding requests, initiated during a period of time, for a plurality of different content items, the requests generated by user computing devices and containing uniform resource locators (URLs) of requested content items;
    modify the content request data at least partly by converting the URLs in at least some of the requests to canonical URLs, wherein converting a URL of a content item to a canonical URL comprises discarding URL text unnecessary for identifying the content item;
    identify, using the modified content request data, a set of content items that have been requested at least a threshold number of times during the period of time;
    generate scores for content items in the set of content items, wherein a score for a first content item of the set of content items is based at least partly on a difference between a current time and a time at which the first content item first reaches a threshold level of popularity;
    select a subset of the content items from the set of content items based at least partly on the scores;
    select a set of trending content items from the subset of content items based at least partly on information, obtained from one or more social network servers, reflecting an amount of social network activity associated with individual content items of the set of trending content items in the period of time; and
    generate a list of user-specific trending content items for a user, the list of user-specific content items generated from the set of trending content items based at least partly on an analysis of content interests associated with the user and corresponding characteristics of content items in the list of user-specific trending content items.

2. The system of claim 1, wherein individual content items comprise a content page, multimedia presentation, image, video, document, or network-accessible file.

3. The system of claim 1, wherein the content interests associated with the user are determined based at least partly on an analysis, conducted using a machine learning model, of previous content requests initiated by the user.

4. The system of claim 1, wherein the content interests associated with the user are determined based at least partly on historical shopping information associated with the user.

5. The system of claim 1, wherein the system is further configured to at least:
generate a screenshot for a least one of the user-specific trending content items using a server-based content rendering module; and
provide the screenshot to a user device of the user in connection with the list of user-specific trending content items.

6. The system of claim 1, wherein the information reflecting social network activity is distinct from the content request data.

7. The system of claim 1, wherein the system processes the requests for content, and generates the content request data based on the requests, by operating as an intermediary between the user computing devices and content servers that host the content items.

8. The system of claim 1, wherein the system is additionally configured to generate, for each of a plurality of the content items, a respective hash of a selected content portion of the content item, and to compare the hashes to identify different content items that contain the same content.

9. The system of claim 1, wherein the system is configured to use an application program interface of a social network to retrieve the information reflecting the amount of social network activity.

10. A system comprising:
a data repository that stores a record of content requests made by user devices to content servers, the record of content requests including uniform resource locators (URLs) included in the content requests, the URLs specifying requested content items; and
a computing system comprising one or more computing devices, the computing system programmed to identify trending content items by a process that comprises:
generating a modified record of content requests at least partly by converting URLs in the record of content requests to canonical URLs, wherein converting a URL of a content item to a canonical URL comprises discarding URL text unnecessary for identifying the content item;
determining, based on the modified record of content requests, rates of change in popularity of particular content items;
selecting, based at least partly on the rates of change in popularity, a subset of the content items that satisfy a popularity condition;
retrieving, for individual content items in the subset, social network interaction data indicating levels to which the respective content items have been the subject of social network activity; and
selecting, from the subset of content items, based at least partly on the social network interaction data, particular content items that are trending.

11. The system of claim 10, further comprising selecting, from the trending content items, particular content items to present to a user based on a combination of (1) content interests of the user, said content interests identified by analyzing content requested by the user, and (2) characteristics of the trending content items.

12. The system of claim 11, wherein the system uses a machine learning model to learn the content interests of the user.

13. The system of claim 10, wherein the system processes and content requests, and generates said record of the content requests, by operating as an intermediary between the user devices and content servers that host the content items.

14. The system of claim 10, wherein the system, in generating the modified record of content requests, is additionally configured to generate, for each of a plurality of the content items, a respective hash of a selected content portion of the content item, and to compare the hashes to identify different content items that contain the same content.

15. The system of claim 10, wherein the system is configured to retrieve the social network interaction data using an application program interface of a social network.

16. The system of claim 10, wherein the social network interaction data for a content item is based at least partly on how many times the content item has been shared by social network users.

17. The system of claim 10, wherein the social network interaction data for a content item is based at least partly on how many times the content item has been commented on by social network users.

* * * * *

UNITED STATES PATENT AND TRADEMARK OFFICE
CERTIFICATE OF CORRECTION

Page 1 of 1

PATENT NO. : 10,311,362 B1
APPLICATION NO. : 14/569367
DATED : June 4, 2019
INVENTOR(S) : Muneer Mirza et al.

It is certified that error appears in the above-identified patent and that said Letters Patent is hereby corrected as shown below:

In the Specification

At Column 6, Line 63, change "deices" to --devices--.

In the Claims

At Column 17, Line 13, change "a" to --at-- second occurrence.

Signed and Sealed this
Twenty-fourth Day of September, 2019

Andrei Iancu
*Director of the United States Patent and Trademark Office*